United States Patent
Dickens

(10) Patent No.: US 9,822,288 B2
(45) Date of Patent: *Nov. 21, 2017

(54) WATERPROOF SILANE-END CAPPED ADHESIVE COMPOSITIONS

(71) Applicant: Carroll Benford Dickens, Santa Ana, CA (US)

(72) Inventor: Carroll Benford Dickens, Santa Ana, CA (US)

( * ) Notice: Subject to any disclaimer, the term of this patent is extended or adjusted under 35 U.S.C. 154(b) by 45 days.

This patent is subject to a terminal disclaimer.

(21) Appl. No.: 15/043,075

(22) Filed: Feb. 12, 2016

(65) Prior Publication Data

US 2016/0160101 A1    Jun. 9, 2016

Related U.S. Application Data

(63) Continuation-in-part of application No. 14/376,112, filed as application No. PCT/US2013/024314 on Feb. 1, 2013, now abandoned, which is a continuation-in-part of application No. 13/365,850, filed on Feb. 3, 2012, now Pat. No. 9,068,103.

(60) Provisional application No. 61/439,271, filed on Feb. 3, 2011.

(51) Int. Cl.

| | |
|---|---|
| C08K 5/24 | (2006.01) |
| H01B 3/44 | (2006.01) |
| C08F 2/44 | (2006.01) |
| C08K 5/09 | (2006.01) |
| C08K 5/10 | (2006.01) |
| C08G 63/83 | (2006.01) |
| C08K 3/26 | (2006.01) |
| C09D 17/00 | (2006.01) |
| C08F 283/12 | (2006.01) |
| C08K 5/54 | (2006.01) |
| C08K 5/56 | (2006.01) |
| C09J 175/04 | (2006.01) |
| C09J 9/02 | (2006.01) |

(52) U.S. Cl.
CPC ............... *C09J 175/04* (2013.01); *C09J 9/02* (2013.01)

(58) Field of Classification Search
None
See application file for complete search history.

(56) References Cited

U.S. PATENT DOCUMENTS

| | | | |
|---|---|---|---|
| 3,723,163 A | 3/1973 | Schumacher | |
| 4,539,345 A | 9/1985 | Hansen | |
| 4,788,270 A | 11/1988 | Anderson et al. | |
| 5,225,512 A | 7/1993 | Baghdachi et al. | |
| 5,373,050 A | 12/1994 | Morikawa et al. | |
| 6,001,946 A | 12/1999 | Waldman et al. | |
| 7,041,374 B1* | 5/2006 | Nelson | C08G 18/10 252/500 |
| 2005/0137323 A1 | 6/2005 | Roesler et al. | |
| 2005/0166797 A1 | 8/2005 | Li et al. | |
| 2006/0124225 A1 | 6/2006 | Wu et al. | |
| 2006/0270770 A1* | 11/2006 | Feng | C08K 5/54 524/268 |
| 2008/0057316 A1 | 3/2008 | Landon et al. | |
| 2008/0146695 A1 | 6/2008 | Nefzger et al. | |
| 2009/0299017 A1 | 12/2009 | Tsuno et al. | |
| 2013/0202970 A1* | 8/2013 | Lu | C08K 5/42 429/246 |
| 2013/0303690 A1 | 11/2013 | Varkey et al. | |

FOREIGN PATENT DOCUMENTS

| | | |
|---|---|---|
| CA | 2753125 A1 | 9/2010 |
| DE | 19929011 A1 | 12/2000 |
| EP | 0601021 A1 | 8/1992 |
| EP | 1697436 B1 | 12/2004 |
| WO | WO9305089 A1 | 3/1993 |

OTHER PUBLICATIONS

Properties of Pyrograf III Carbon Nanofibers Aug .22, 2012. pp. 1-6.*
Product Information Sheet for TS-720, CAB-O-SIL, Apr. 2004, pp. 1-2.
3M Fluorad Fluorosurfactant FC-4430 Product Information; 3m Specialty Materials, 3M Center, Building 223-6S-04, St. Paul, MN 55144-1000; Issued Mar. 2002.

* cited by examiner

Primary Examiner — Robert T Butcher

(57) ABSTRACT

A polymeric matrix adhesive composition and methods of preparing said compositions. A silane is added to a prepolymer urethane to react with the urethane and at least partially end-cap the urethane to produce a silane end-capped polymer component. A reinforcing extender and a thixotropic agent are reacted with the silane end-capped polymer component. The cured product of the polymeric matrix adhesive composition is waterproof, hydrolytically stable, and pH resistant.

13 Claims, 8 Drawing Sheets
(6 of 8 Drawing Sheet(s) Filed in Color)

WATERPROOF SILANE-END CAPPED ADHESIVE COMPOSITIONS

CROSS REFERENCE

This application is a continuation-in-part and claims benefit of U.S. patent application Ser. No. 14/376,112, filed Jul. 31, 2014, which is a 371 of PCT/US13/24314, filed Feb. 1, 2013, which claims benefit of U.S. patent application Ser. No. 13/365,850, filed on Feb. 3, 2012, which is a nonprovisional of U.S. Provisional Patent Application No. 61/439,271, filed Feb. 3, 2011, the specification(s) of which is/are incorporated herein in their entirety by reference.

FIELD OF THE INVENTION

The present invention is directed to a waterproof adhesive, e.g., a formulated silane end-capped adhesive. The adhesive may be used, for example, to form a chemical bond between flooring materials and substrates.

BACKGROUND OF THE INVENTION

Adhesives are used to bond flooring materials, such as carpet, tile, and linoleum, to rigid substrates, such as concrete. During the early part of the 1990s, the flooring industry moved from solvent-born adhesives to aqueous or water-born formulations. Subsequently, it became evident that the water-born formulations were sensitive to elevated concrete moisture and pH. The current standard industry practice to combat the issue of pH catalyzed moisture degradation is to apply a moisture barrier coating with near zero permeability to the concrete surface in order to negate the effects of alkaline moisture attack and protect installation adhesives from failure. Application of said coating can be expensive, difficult, and time-consuming. In cases where floors are subjected to elevated moisture from maintenance, flooding, or relatively high humidity, the failure of these water-born formulations can lead to extensive and costly repairs. Hence, there is a need for adhesives that exhibit alkaline and waterproof properties in order to mitigate the problems caused by high moisture and alkalinity.

SUMMARY

It is an objective of the present invention to provide for a waterproof and pH resistant adhesive composition, as specified in the independent claims. Embodiments of the invention are given in the dependent claims. Embodiments of the present invention can be freely combined with each other if they are not mutually exclusive.

According to one embodiment, the present invention features a polymeric matrix adhesive composition comprising a cured product of a silane end-capped polymer component comprising a silane and a urethane component, a reinforcing extender, and a thixotropic agent. In some embodiments, the urethane component has an average NCO content of about 7 to 23. In other embodiments, the urethane component comprises at least one urethane selected from a group consisting of a slow-cure urethane having a functionality (Fn) of about 2.5 to 2.55 and an NCO content of about 15 to 23%, and a flexible binder urethane having a functionality (Fn) of about 2 and an NCO content of about 2 to 10%. Preferably, the adhesive composition is waterproof, hydrolytically stable, and pH-resistant.

One of the unique inventive technical features of the present invention is the specific range of % NCO content and functionality (Fn) of the urethane component. Another unique inventive technical feature is the hydrophobic modification of the reinforcing extender and thixotropic agent. Without wishing to limit the invention to any theory or mechanism, it is believed that the technical features of the present invention advantageously provide for an adhesive composition that, when cured, is waterproof, hydrolytically stable, and pH-resistant. None of the presently known prior references or work has the unique inventive technical feature of the present invention.

According to another embodiment, the present invention features a polymeric matrix adhesive composition comprising a cured product of a silane end-capped polymeric component comprising a silane and a urethane component, a reinforcing extender, and a thixotropic agent. The urethane component can have an average NCO content of about 7 to 23. Preferably, the urethane component comprises a slow-cure urethane having a functionality (Fn) of about 2.5-2.55 and an NCO content of about 15 to 23%, and a flexible binder urethane having a functionality (Fn) of about 2 and an NCO content of about 2 to 10%. A weight ratio of the slow-cure urethane to the flexible binder urethane can range from about 2:1 to 4:1.

According to yet another embodiment, the present invention may feature a polymeric matrix adhesive composition comprising a cured product of a silane end-capped polymeric component comprising a silane and a urethane component, a polyether diol having an average molecular weight of at least about 4,000 g/mol, a reinforcing extender, and a thixotropic agent. The urethane component may comprise a slow-cure urethane having a functionality (Fn) of about 2.5 to 2.55 and an NCO content of about 15 to 23%. Preferably, a weight ratio of the slow-cure urethane to the polyether diol is about 1:2 to 2:1.

The present invention also features a method of producing a polymeric matrix adhesive. In some embodiments, the method comprises combining under high speed dispersion: a slow-cure urethane prepolymer; a flexible binder urethane prepolymer or a polyether polyol; an amino-functional alkoxysilane; an aliphatic metal catalyst; an aliphatic hydrocarbon quenching agent; a moisture scavenging agent; a reinforcing extender; and a thixotropic agent.

The present invention also features a method of bonding a flooring material to a substrate. In some embodiments, the method comprises providing a polymeric matrix adhesive of the present invention, applying the polymeric matrix adhesive to a substrate, and fixing a flooring material to the substrate. In some embodiments, the substrate is concrete. In some embodiments, the flooring material is wood flooring, rubber flooring, or carpet tile.

The present invention also features a flooring material system. In some embodiments, the system comprises a flooring material; and an adhesion promoter, the adhesion promoter being selected from the group consisting of: silica, quartz, glass, aluminum, copper, alumina, alumino-silicate, mica, talk, an inorganic oxide, steel, iron, asbestos, nickel, zinc, lead, calcium carbonate, calcium sulfate, and barium sulfate.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

BRIEF DESCRIPTION OF THE DRAWINGS

This patent application contains at least one drawing executed in color. Copies of this patent or patent application publication with color drawing(s) will be provided by the Office upon request and payment of the necessary fee.

The features and advantages of the present invention will become apparent from a consideration of the following detailed description presented in connection with the accompanying drawings in which.

DESCRIPTION OF PREFERRED EMBODIMENTS

Figure 1:
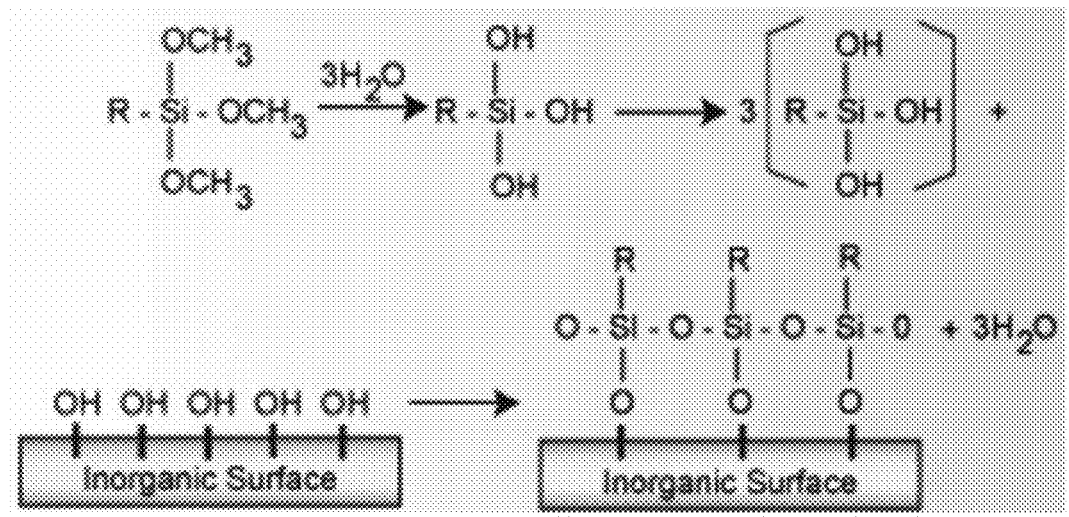
FIG. 1 is an illustration of a silanol condensation reaction.

Before the present invention is disclosed and described, it is to be understood that this invention is not limited to specific compositions, systems and methods, as such may, of course, vary. It is also to be understood that the terminology used herein is for the purpose of describing particular embodiments only and is not intended to be limiting.

Polyurethane prepolymers may be formed by combining an excess of diisocyanate with polyol. One of the NCO groups of the diisocyanate reacts with one of the OH groups of the polyol. The other end of the polyol reacts with another diisocyanate. The resulting prepolymer has an isocyanate group on both ends. The prepolymer is a diisocyanate itself, and it reacts like a diisocyanate but with several important differences. When compared with the original diisocyanate, the prepolymer has a greater molecular weight, a higher viscosity, a lower isocyanate content by weight (% NCO), and a lower vapor pressure. Instead of a diol, a triol or higher functional polyol could also be used for the polyol in the reaction, as long as an excess amount of diisocyanate is used. Molar ratios of diisocyanate to polyol greater than 2:1 can also be used. These are called quasi-prepolymers.

As used herein, a slow-cure urethane prepolymer is polyisocyantate prepolymer based on diphenylmethane diisocyanate (MDI). High functionality (Fn) and NCO content gives increased reactivity to this component. On its own this prepolymer will form highly rigid films and must be modified for proper application requirements. As used herein, a flexible binder urethane prepolymer is polyisocyanate prepolymer based on diphenylmethane diisocyanate (MDI). Lower functionality and NCO content makes this prepolymer less reactive and slower curing. Higher equivalent weight gives this component additional flexibility and gap bridging properties. Tables 1-3 provide standards for the slow-cure urethane prepolymer and the flexible binder urethane prepolymer. A single slow-cure urethane prepolymer possessing properties similar to the mixture of the two components could be used. Equivalents or substitutes are within the scope of the present invention.

TABLE 1

| Urethane Prepolymer | Fn | Sp Gravity @ 25° C. | % NCO | Eq Wt | Viscosity cps @ 25° C. |
|---|---|---|---|---|---|
| Slow-cure urethane prepolymer | 2.54 | 1.12 | 15.8 | 266 | 3400 |
| Flexible binder urethane prepolymer | 2.00 | 1.10 | 9.7 | 433 | 2000 |

TABLE 2

SLOW-CURE URETHANE PREPOLYMER SPECIFICATIONS

| Property | Value |
|---|---|
| NCO content, % | 15.0-23.0 |
| Viscosity @ 25 C., cps | 3000-8000 |
| Appearance | Brown liquid |
| Eq wt | 250-270 |
| Fn | 2.5-2.55 |

TABLE 3

FLEXIBLE BINDER URETHANE SPECIFICATIONS

| Property | Value |
|---|---|
| NCO content, % | 2.0-10.0 |
| Viscosity @ 25 C., cps | 1500-3500 |
| Appearance | Clear liquid |
| Eq wt | 425-550 |
| Fn | 2.00 |

In one embodiment, a silane is used to react with the urethane prepolymers to form a silane end-capped polymer, i.e. a silane end-capped polyurethane. Non-limiting examples of silanes include alkoxysilanes such as amino-functional alkoxysilanes, gamma-aminopropyltrimethoxysilane, benzylamino, chloropropyl, epoxy, epoxy/melamine, ureido, vinyl-benzyl-amino, the like, or a combination thereof. The alkoxysilane is not limited to the aforementioned examples.

In another embodiment, the urethane prepolymer may be substituted with a polycarboxylate (e.g., to create a silane end-capped polycarboxylate). In another embodiment, the flexible binder urethane prepolymer or the slow-cure urethane prepolymer may be substituted or mixed in with a tackifier. Examples of tackifiers include, but are not limited to, polyether polyol, carboxylic diols, and alkoxy-functionalized silicone polymers such as polydimethyl siloxane. For illustrative purposes, the tackifier may be a high molecular weight (e.g., greater than about 4,000 g/mol) polyether polyol. The polyether polyol may help increase adhesive flexibility. For example, the polyether polyol increases elongation and flexible adhesion yet maintains formulation stability. The polyether polyol may help provide a dry film suitable for use with flooring substrates that demonstrate dimensional properties of expansion and contraction. A softer or more flexible product may also function as a sound abatement system (e.g., for wood flooring installations). A softer or more flexible product may also produce an adhesive bond line that holds carpet tile firmly yet allows removal via peeling the floor back (e.g., at a severe angle) creating cohesive failure of the adhesive. Table 4 describes a non-limiting example of properties of a polyether polyol.

TABLE 4

TYPICAL PROPERTIES OF POLYETHER POLYOL

| Property | Value |
| --- | --- |
| Appearance | Clear viscous liquid |
| Specific Gravity at 20° C. | 1.01 |
| Viscosity at 25° C., cps | 980 |
| Flash Point, PMCC, ° C. | 213 |
| Bulk Density, lb/gal | 8.38 |

Hydrophobic modification is the treatment of a substrate's surface so that it becomes non-polar. A surface can be polar because of the hydrogen bonding locations. By eliminating or reducing the hydrogen bonding at the surface, the surface is shielded from interacting with water molecules and is therefore rendered hydrophobic. For calcium carbonate, it is theorized that although calcium carbonates do not form stable bonds with silicates, the low molecular weight and low surface energy of the silicates allow for the silicates to penetrate porous structures and encapsulate the substrate in a silica-rich network.

In some embodiments, the hydrophobically modified reinforcing extender may contribute to the overall waterproof quality of the cured, waterproof polymeric matrix adhesive. In other embodiments, the hydrophobically modified reinforcing extender provides an increase in mechanical strength, provides dimensional stability, build viscosity, reduce shrinkage, and reduce cracking in the adhesive of the present invention. For example, a reinforcing extender, such as a mineral component can be hydrophobically modified by adding a silane or aliphatic silane. Examples of mineral components include, but are not limited to, calcium carbonate, limestone, layered clays, aluminates, hydrotalcite and the like. Illustrative of a hydrophobically modified reinforcing extender is a hydrophobically modified calcium carbonate.

A thixotropic agent can function as a thickener and/or to build viscosity. Preferably, the thixotropic agent is hydrophobically modified. In some embodiments, the following may be used as thixotropic agents: fumed silica, hydrogenated castor oil derivatives, hydrophobically modified cellulosic materials, surface modifiers based on polyethylene, polypropylene and PTFE technologies, hydrated magnesium aluminosilicate and the like.

In some embodiments, an aliphatic quenching agent can terminate chemical reactions such that the adhesive formulation has minimal to no reactivity (i.e. inert). A non-limiting example of the aliphatic quenching agent is an aliphatic fatty acid ester mixture. The aliphatic fatty acid ester mixture is a UV stable, zero VOC solvent having low viscosity, possessing high flash point and low volatility. This solvent readily biodegrades in the environment (>90% in 28 days). This solvent is not derived from petroleum distillates, is non-toxic, non-hazardous under RCRA, non-HAPS and meets clean air solvent certification. Aliphatic Fatty Acid Ester Mixture is sold under various trade names, for example: Solvation (Shepard Bros, La Habra, Calif.) and Promethean ME (Promethean Biofuels, Temecula, Calif.). In some embodiments, the following agents may be used as aliphatic fatty acid esters in accordance with the present invention: fatty acid methyl esters (FAME) such as myristic acid, palmitic acid, palmitoleic acid, stearic acid, oleic acid, linoleic acid, eicosanoic acid, docosenoic acid and the like, which are molecules in biodiesel derived from the transesterification of vegetable oils and the like.

Further non-exhaustive examples of quenching agents include mixtures of aliphatic hydrocarbons of various molecular weights and fractionation containing alkanes, alkenes and alkynes derived, but not exclusively, from petroleum sources. Mixtures may also contain natural hydrocarbons from biological sources such as terpenes and isoprene and the like. These mixtures exhibit partial solubility of the urethane formulation components. The following tables are non-limiting examples of properties of quenching agents that may be used in accordance with the present invention. Equivalents or substitutes are within the scope of the present invention.

TABLE 5.1

Petroleum Distillates

| | |
| --- | --- |
| Molecular Weight: | approximately 87-114 |
| Odor: | pleasant aromatic odor |
| Boiling Range: | 95-160° C. |
| Specific Gravity: | 0.7275-0.7603 |
| Color: | clear, water white to yellow |
| Vapor Pressure: | 2-20 mm Hg at 20° C. |
| Flashpoint: | −6.7 to 12.8° C. (closed cup) |
| Synonyms: | benzene, naphtha 76, ligroin, high boiling petroleum ether |
| Molecular Species: | $C_7$-$C_{11}$ |

TABLE 5.2

Terpenes and Isoprene

| | |
| --- | --- |
| Molecular Weight: | $C_5H_8$ |
| Molar Mass: | 68.12 g/mol |
| Density: | 0.681 g/cm$^3$ |
| Melting Point: | −143.95° C. |

TABLE 5.2-continued

| Terpenes and Isoprene | |
|---|---|
| Boiling Point: | 34.067° C. |

TABLE 5.3

| Stoddard Solvent | |
|---|---|
| Molecular Weight: | approximately 135-145 |
| Odor: | kerosene-like |
| Boiling Range: | 160-210° C. |
| Specific Gravity: | 0.75-0.80 |
| Color: | colorless |
| Vapor Pressure: | 4-4.5 mm Hg at 25° C. |
| Flashpoint: | 37.8° C. (closed cup) |
| Synonyms: | 140 flash solvent, odorless solvent and low end point solvent |
| Molecular Species: | $C_9$-$C_{11}$ |

TABLE 5.4

| Mineral spirits | |
|---|---|
| Molecular Weight: | approximately 144-169 |
| Odor: | pleasant sweet odor |
| Boiling Range: | 150-200° C. |
| Specific Gravity: | 0.77-0.81 |
| Color: | clear, water white |
| Vapor Pressure: | 0.8 mm (Hg) at 20° C. |
| Flashpoint: | 30.2-40.5° C. (closed cup) |
| Synonyms: | white spirits, petroleum spirits, and light petrol |
| Molecular Species: | $C_9$-$C_{12}$ |

In other embodiments, a catalyst is used to accelerate chemical reactions and promote curing of the adhesive. The catalyst is preferably an aliphatic metal catalyst such as dibutyltindilaurate. The percent weight of the aliphatic metal catalyst is about 0.001 to 5% (e.g., 0.1%). Other examples of the aliphatic metal catalyst include, but are not limited to, organometallic compounds based on mercury, lead, tin, bismuth, zinc, the like, or a combination thereof.

In further embodiments, a moisture scavenger may be used to limit the amount of moisture contamination absorbed from the atmosphere. In one embodiment, the moisture scavenger comprises vinyl-functionalized methoxy silane, such as vinyltrimethoxysilane.

In yet other embodiments, adhesion promoters may be used as cross-linking agents to improve adhesion between inorganic fillers, basic materials and resins. Examples of adhesion promoters include, but are not limited to, silane based crosslinkers such as oximesilane crosslinkers, alkyl-functionalized silane crosslinkers, aminosilane crosslinkers, and alkoxysilane crosslinkers such as glycidoxypropyltrimethoxysilane. For example, glycidoxypropyltrimethoxysilane is an epoxy substituted alkoxysilane used as a cross-linking agent and adhesion promoter. Glycidoxypropyltrimethoxysilane finds unsaturated sites and reacts to provide potential excess silane to increase the likelihood of the silanol-bridge bonding mechanism between the adhesive and the substrate improving mechanical strength.

In still other embodiments, additional tackifiers may be used to plasticize the adhesive and/or reduces moisture sensitivity and/or enhances flexibility and adhesion to low energy flooring substrate. In some embodiments, the tackifier is the methyl ester of rosin. Below is a non-limiting example of a tackifier (Table 6). Equivalents or substitutes are within the scope of the present invention.

Methyl Ester of Rosin has a resinous nature, clarity, high refractive index, low vapour pressure, high boiling point, and good thermal stability. It has excellent surface wetting properties and is compatible and miscible with a wide variety of materials. It is soluble in esters, ketones, alcohols, ethers, coal tar, petroleum hydrocarbons, and vegetable and mineral oils. It is insoluble in water. It is compatible at all ratios, or in limited but practically useful proportions, with nitrocellulose, ethylcellulose, chlorinated rubber, and most other film-formers; with water-soluble film-formers such as starch, casein, and glue; with natural and synthetic rubbers, natural and synthetic resins, waxes, and asphalt. It is incompatible with cellulose acetate and polyvinyl acetate. These physical properties, plus its wide compatibility, make it useful in a variety of applications, including lacquers, inks, paper coatings, varnishes, adhesives, sealing compounds, plastics, wood preservatives and perfumes. To assure minimum odour of products in which it is used, it is given a special steam sparging treatment. Methyl ester of rosin is used in lacquers to contribute high gloss, clarity, and fullness; as a plasticizing resin in pressure-sensitive and hot-melt adhesives for superior adhesion, resistance to sweating or exudation, and reduced moisture sensitivity; as a fixative and carrier in perfumes and cosmetic preparations for its low vapour pressure, neutral character, pleasant odour, and high co-solvent action; for various combinations of these and other properties in inks, varnishes, and asphalts; as a replacement for castor oil; as a rubber softener; and in many similar applications. Methyl ester of rosin is sold under various trade names, for example: Abalyn (Eastman Chemical BV, The Netherlands)

TABLE 6

| METHYL ESTER OF ROSIN | |
|---|---|
| Property | Value |
| Density at 25° C. | 1.04 kg/dm$^3$ |
| Water Solubility | Insoluble |
| Viscosity at 25° C. | 3000-6000 mPa · s |
| Flash Point | 170° C. |
| Refractive Index at 20° C. | 1.530 |

Figure 2:
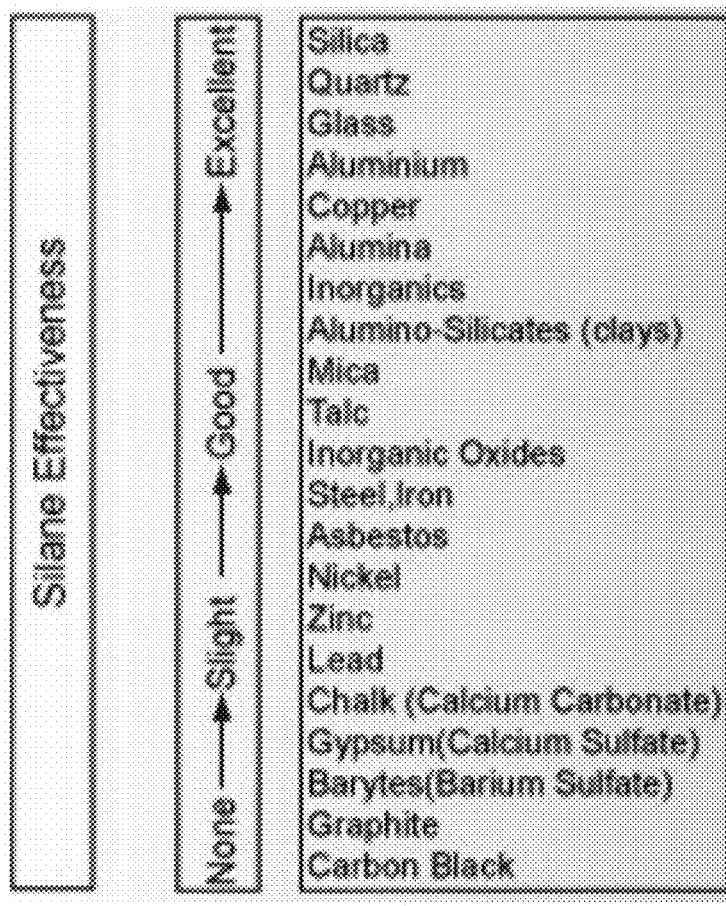
FIG. 2 is a description showing additives that promote flooring material adhesion.

Referring now to FIG. 1-2, the present invention features polymeric matrix adhesives. The adhesives of the present invention comprises a blend of prepolymer (e.g., urethane prepolymer) that is modified with a silane, e.g., a trimethoxy substituted amino functional silane, in the manufacturing process (e.g. in situ). In some embodiments, a mixture of naturally derived aliphatic fatty acid ester is used as a diluent/compatibilizer that assists in the incorporation of hydrophobically-treated calcium carbonates and hydrophobically-treated fumed silica viscosifiers. Final adhesive formulation viscosity may be adjusted to provide trowelability and overall aesthetic.

As shown in FIG. 1, the adhesives of the present invention undergo a silanol-bridge mechanism to form waterproof chemical bonds, i.e. urethane and silanol condensation bonds, to the concrete surface and to the flooring material. In some embodiments, the adhesive bond that is formed is alkali stable to pH 14. Evaluation of concrete moisture according to ASTM F1869 may exceed 15 lbs/1000 sf/24 hrs and according to ASTM F2170 to 100% RH. Generally, the silanol condensation reaction is waterproof, solvent proof, and heat resistant. The cured adhesive creates a hydrophobic barrier to liquid water, yet allows water vapor and other gasses to move through the concrete/adhesive/flooring matrix.

Adhesive Compositions

According to one embodiment, the present invention features a polymeric matrix adhesive composition comprising a cured product of a silane end-capped polymer component comprising a silane and a urethane component, a reinforcing extender, and a thixotropic agent. In some embodiments, the urethane component has an average NCO content of about 7 to 23. In other embodiments, the urethane component comprises at least one urethane selected from a group consisting of a slow-cure urethane having a functionality (Fn) of about 2.5 to 2.55 and an NCO content of about 15 to 23%, and a flexible binder urethane having a functionality (Fn) of about 2 and an NCO content of about 2 to 10%. Preferably, the adhesive composition is waterproof, hydrolytically stable, and pH-resistant. In some embodiments, the cured, waterproof polymeric matrix adhesive is amorphous, which is a noncrystalline solid in which the atoms and molecules are not organized in a definite lattice pattern.

As used herein, the term "waterproof" is defined as being impenetrable by water. This should not be confused or interchanged with the term "water-resistant", which is defined as being penetrated by water over time and under high pressures. As used herein, the term "hydrolytically stable" is defined as resisting chemical decomposition in the presence of water.

In some embodiments, the composition may comprise about 15-85 wt % of the silane end-capped polymer component, about 3-7 wt % of the reinforcing extender, and about 2-5 wt % of the thixotropic agent. In preferred embodiments, the reinforcing extender and thixotropic agent are hydrophobically modified.

In one embodiment, the composition may further comprise about 25-55 wt % of a polyether diol having an average molecular weight of at least about 4,000 g/mol. In another embodiment, the composition may further comprise about 25-55 wt % an alkoxy-functionalized silicone polymer having terminal silanol groups.

In yet another one embodiment, the composition may further comprise about 6-10 wt % of an aliphatic quencher. In still another embodiment, the composition may further about 0.005-0.025 wt % of an alkyl-functionalized silane-based crosslinker.

In some embodiments, the composition may further comprise carbon nanofibers effective for increasing electrical conductivity of the adhesive composition. Each carbon nanofiber can have a fiber diameter of about 120 to 160 nm, and a dispersive surface energy of about 120 to 140 mJ/m$^2$. Without wishing to limit the invention to a particular theory or mechanism, the carbon nanofibers can provide enhanced electrical conductivity over a broad range along with mechanical reinforcement of the adhesive. Other benefits provided by the carbon nanofibers include improved heat distortion temperatures and increased electromagnetic shielding.

In other embodiments, the composition may further comprise an inherently static dissipative (IDP) component effective for decreasing surface resistance of the adhesive composition. Other benefits of the IDP component include the ability to ground potentially hazardous charges. The IDP component can have a surface resistivity of about $10^7$ to $10^{10}$ Ω/sq. Examples of the IDP component include, but are not limited to, polypropylene, polystyrene, polyethylene, and acrylic polymers. Adhesives of the present invention having the carbon fibers and IDP component would be suitable for use in electronics manufacturing clean rooms.

According to another embodiment, the present invention features a polymeric matrix adhesive composition comprising a cured product of a silane end-capped polymeric component comprising a silane and a urethane component, a reinforcing extender, and a thixotropic agent. The silane may be an amine functionalized methoxy silane. The urethane component can have an average NCO content of about 7 to 23. Preferably, the urethane component comprises a slow-cure urethane having a functionality (Fn) of about 2.5-2.55 and an NCO content of about 15 to 23%, and a flexible binder urethane having a functionality (Fn) of about 2 and an NCO content of about 2 to 10%. A weight ratio of the slow-cure urethane to the flexible binder urethane can range from about 2:1 to 4:1. For instance, the adhesive composition may comprise about 75-85 wt % of the silane end-capped polymer component with a weight ratio of the slow-cure urethane to the flexible binder urethane is about 3:1, about 3-7 wt % of the reinforcing extender, and about 2-5 wt % of the thixotropic agent. In preferred embodiments, the reinforcing extender and thixotropic agent are hydrophobically modified. In other embodiments, the composition may further comprise about 6-10 wt % of an aliphatic quencher.

Table 7 describes an exemplary adhesive composition, referred to as the LVT adhesive, of the present invention.

| Component | Percent weight |
| --- | --- |
| Slow-cure urethane prepolymer | 55-65 |
| Flexible binder urethane prepolymer | 15-30 |
| Amine-functionalized methoxysilane | 0.01-1.5 |
| Dibutyltindilaurate | 0.001-.01 |
| Aliphatic fatty acid ester mixture | 5-10 |
| Vinyltrimethoxysilane | 0.005-0.015 |
| Reinforcing extender | 3-10 |
| Thixotropic agent | 1-5 |
| Methyl ester of rosin | 0.5-1.5 |
| Pigment | 0.005-0.015 |

Alternatively, the flexible binder urethane may be substituted by a polyether or an alkoxy-functionalized silicon polymer. For instance, according to one embodiment, the present invention may feature a polymeric matrix adhesive composition comprising a cured product of a silane end-capped polymeric component comprising a silane and a urethane component, a polyether diol having an average molecular weight of at least about 4,000 g/mol, a reinforcing extender, and a thixotropic agent. The urethane component may comprise a slow-cure urethane having a functionality (Fn) of about 2.5 to 2.55 and an NCO content of about 15 to 23%. Preferably, a weight ratio of the slow-cure urethane to the polyether diol is about 1:2 to 2:1. In some embodiments, the reinforcing extender and thixotropic agent are hydrophobically modified. In other embodiments, the composition may further comprise about 6-10 wt % of an aliphatic quencher.

In one embodiment, the composition may comprise about 40-55 wt % of the silane end-capped polymer component, about 25-40 wt % of the polyether diol, about 3-7 wt % of the reinforcing extender, and about 2-5 wt % of the thixotropic agent. The weight ratio of the slow-cure urethane to the polyether diol is about 3:2. In another embodiment, the composition may comprise about 15-30 wt % of the silane end-capped polymer component, about 40-55 wt % of the polyether diol, about 3-7 wt % of the reinforcing extender, and about 2-5 wt % of the thixotropic agent. The weight ratio of the slow-cure urethane to the polyether diol is about 3:5.

Table 8 describes an exemplary adhesive composition, referred to as the VCT adhesive, of the present invention.

| Component | Percent weight |
|---|---|
| Slow-cure urethane prepolymer | 40-55 |
| Polyether | 25-40 |
| Amine-functionalized methoxysilane | 0.01-1.5 |
| Dibutyltindilaurate | 0.001-.01 |
| Aliphatic fatty acid ester mixture | 5-10 |
| Vinyltrimethoxysilane | 0.005-0.015 |
| Reinforcing extender | 3-10 |
| Thixotropic agent | 1-5 |
| Methyl ester of rosin | 0.5-1.5 |
| Pigment | 0.005-0.015 |

Table 9 describes an exemplary adhesive composition, referred to as the VSF adhesive, of the present invention.

| Component | Percent weight |
|---|---|
| Slow-cure urethane prepolymer | 10-30 |
| Polyether | 40-55 |
| Amine-functionalized methoxysilane | 0.01-1.5 |
| Dibutyltindilaurate | 0.001-.01 |
| Aliphatic fatty acid ester mixture | 5-10 |
| Vinyltrimethoxysilane | 0.005-0.015 |
| Reinforcing extender | 3-10 |
| Thixotropic agent | 1-5 |
| Methyl ester of rosin | 0.5-1.5 |
| Pigment | 0.005-0.015 |

In embodiments of the present invention, the silane end-capped polymeric component can form a silanol bridge with the flooring substrate. The silane can be an aminofunctional silane to promote adhesion between inorganic and organic polymers and the like. In some embodiments, the silane end-capped polymeric component ranges in molecular weight from about 3,000 g/mol to 10,000 g/mol.

In embodiments of the present invention, the urethane component facilitates a moisture cure process. In a moisture cure process, water is removed from the adhesive by reacting with the free isocyanate from the excess urethane prepolymer. The water and isocyanate react to form carbamic acid. The carbamic acid is highly unstable and therefore breaks down into an amine and carbon dioxide. The gaseous carbon dioxide is released from the adhesive matrix. The amine reacts with other isocyanate molecules and forms a urea linkage. The urea linkage contributes to the increased crosslink density of the adhesive.

In some embodiments, the urethane component comprises pure urethane. In other embodiments, the urethane component comprises hybrid polymers of epoxy and urethane. In further embodiments, the urethane component may be replaced with a polyether polyol of varying molecular weight, ranging from 4,000 g/mol to 10,000 g/mol and having a Hydroxyl number of less than 29.5 mg KOH/g Polyol. As understood by one of ordinary skill, the hydroxyl number is the weight of KOH in milligrams that will neutralize the acid from 1 gram of polyol.

Below is a non-limiting example of elemental atomic concentrations detected in the adhesives (Table 10). Equivalents or substitutes are within the scope of the present invention.

TABLE 10

ATOMIC CONCENTRATIONS OF ELEMENTS DETECTED IN THE ADHESIVES

| Element | LVT Atomic % | VCT Atomic % |
|---|---|---|
| Carbon (C) | 71.76 | 78.34 |
| Oxygen (O) | 18.77 | 15.44 |
| Silicon (Si) | 7.60 | 2.24 |
| Calcium (Ca) | 1.15 | 1.82 |
| Nitrogen (N) | 1.13 | 1.13 |
| Sulfur (S) | — | 0.64 |
| Chlorine (Cl) | — | 0.40 |

The data in Table 10 was collected using x-ray photoelectron spectroscopy (XPS). The XPS analysis was performed over an elliptical area irradiated by the low-energy (1487 eV) monochromatic aluminum KD x-ray beam with a major axis of 1.2 mm and a minor axis of 0.6 mm. This is an area of approximately 0.6 mm$^2$. A wide-angle input lens, hemispherical analyzer, and a multi-channel detector make the spectrometer very efficient. The depth of the analyzed volume is about 8 nm, which is determined by the small mean-free path of the emitted photoelectrons. The elemental survey spectra cover the binding energy range from 0 to 1100 eV, with a step size of 0.5 eV. This step size, with the monochromator, the moderate analyzed area size, and a high signal-to-noise ratio, improves the quantitative accuracy and sensitivity beyond industry standards. The XPS system consists of a turbomolecularly pumped introduction chamber, an ion pumped sample preparation chamber, and an analysis chamber which is also ion pumped. When samples are inserted into the Analysis Chamber, they pass through the Preparation Chamber, which decreases the exposure of the Analysis Chamber to water vapor and hydrocarbons from the Introduction Chamber.

The elements present are consistent with a polyurethane (carbon, oxygen, and nitrogen) in addition to siloxane (accounting for the silicon) and calcium carbonate (accounting for the calcium). The chlorine and sulfur are present in trace amount in the vinyl composition tile adhesive.

Partially end-capped, silane modified moisture-cure urethane blend having a content percentage ratio of free reacting urethane and silane end-capped urethane of approximately 1:4 (25% free urethane to 75% silane end-capped urethane). This ratio can vary dependent upon final cure response. Higher free urethane content provides for a faster more reactive final formulation suitable for applications requiring more immediate cure such as concrete anchoring. Higher end capped ratios provide slower reactivity allowing for broad field application of adhesive more suited to flooring installations. The synergistic physical formulation is a hydrolytically stable suspension of the previously described modified urethane component blend in a hydrophobic carrier, having the final viscosity adjusted with hydrophobically modified organic and inorganic viscosifiers. This final reactive formulation is a careful non-stoichiometric balance of reagents, held in suspension by the hydrophobic carrier, that when exposed to moisture functionally repels liquid water yet allows water vapor (restricted reagent) to react and fulfill the kinematic restriction found in the reaction simplex.

Referring now to FIGS. 5-15, the figures show non-limiting examples of adhesives of the present invention in comparison to other commercial adhesives. Equivalents or substitutes are within the scope of the present invention.

Figure 5:
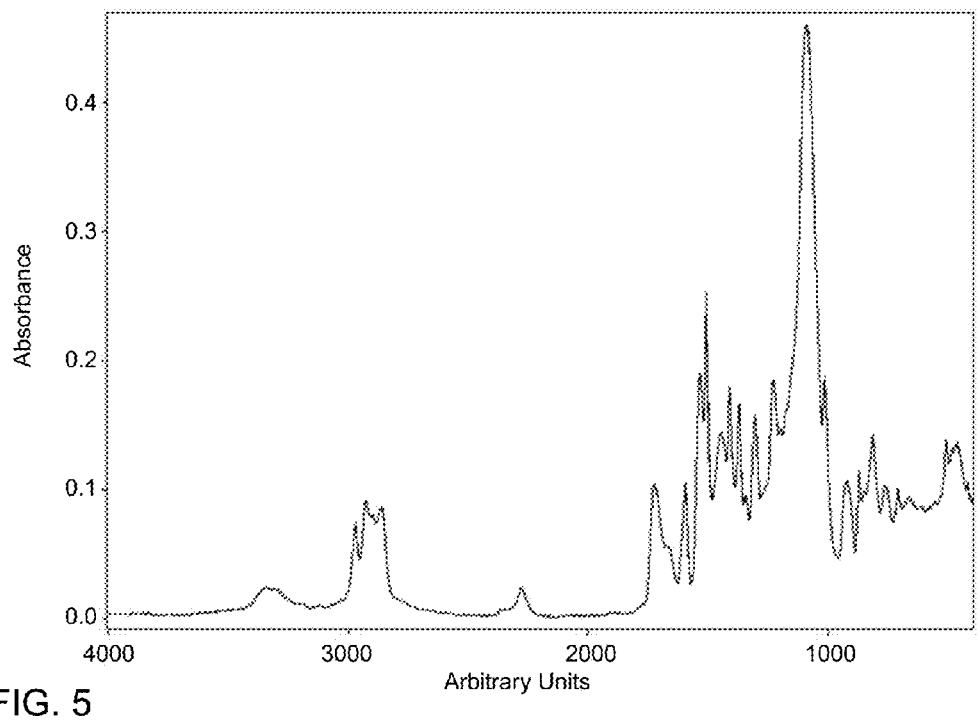
FIG. 5 is an FTIR spectrum of a cured Luxury Vinyl Tile (LVT) adhesive sample according to an embodiment of the present invention.
Figure 6:
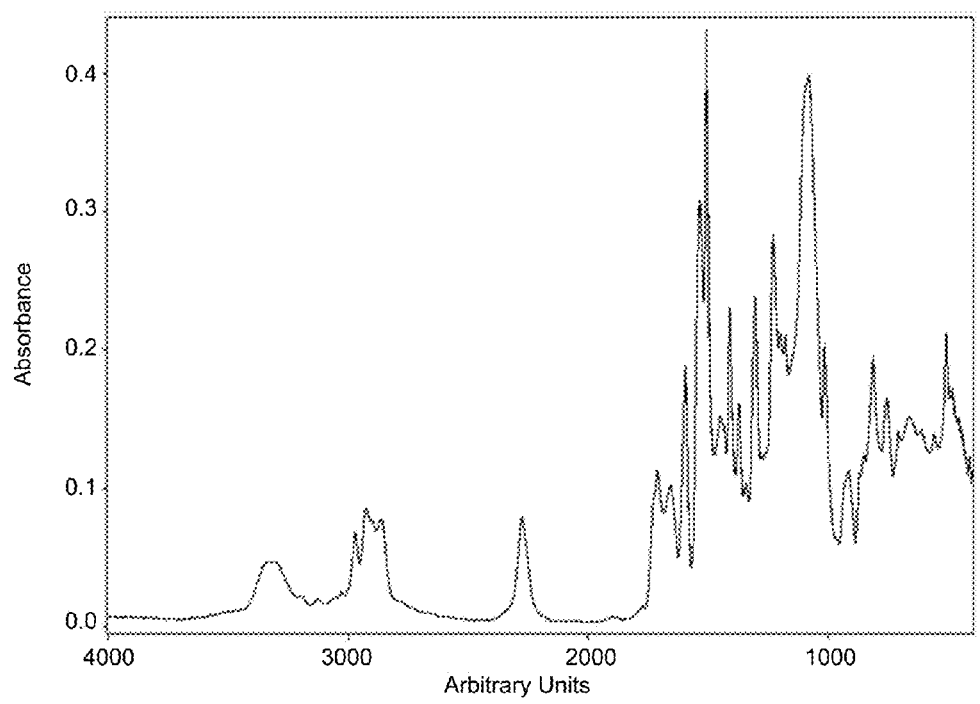
FIG. 6 is an FTIR spectrum of a cured Vinyl Composition Tile (VCT) adhesive sample according to an embodiment of the present invention.

For FIGS. 5 and 6, all FTIR data were collected using a JASCO 6100 Infra-red spectrometer equipped with a Golden Gate Attenuated Total Reflectance (ATR) Cell. Spectra were analyzed using BioRad's KnowItAll Informatics System, Jasco IR Edition. The sample was scanned 256 times to obtain a high signal to noise ratio.

Each adhesive was analyzed after curing. In the case of both adhesives, the isocyanate peak is weakly present at 2270 cm$^{-1}$. The luxury vinyl tile adhesive has a smaller isocyanate peak than the vinyl composite tile adhesive. This is consistent with the measurements made by the titration of the free isocyanate groups and the physical properties of the material. Furthermore, the 3320 cm$^{-1}$ peak present is a feature consistent with the N—H bonds of the polyurethane linkages. This can be observed for both the cured luxury vinyl tile and the vinyl composition tile adhesives.

Figure 3:
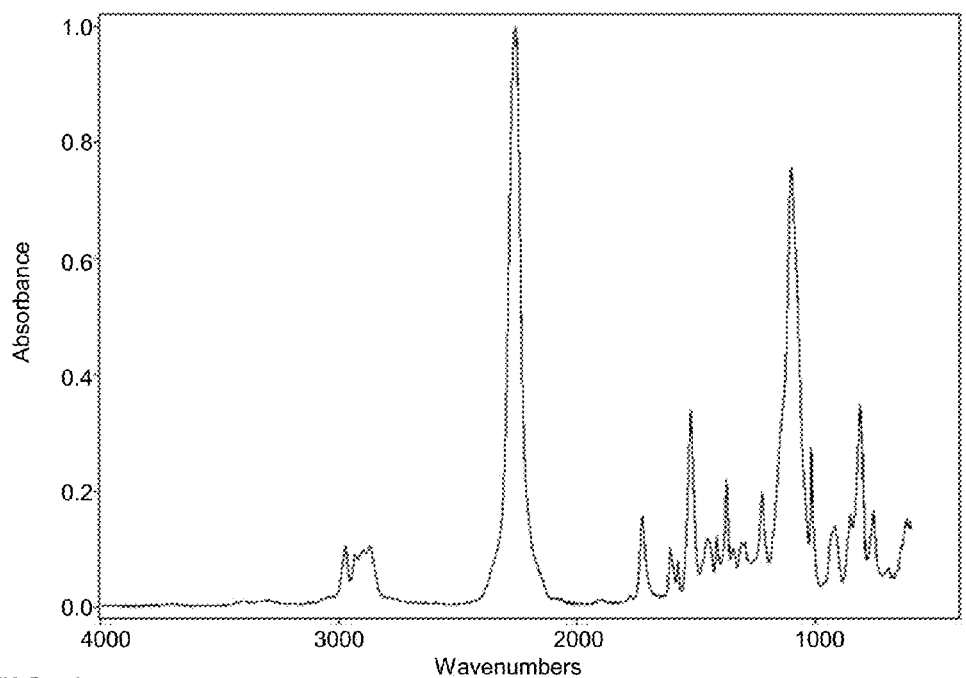
FIG. 3 is an FTIR reference spectrum of a polyurethane material.
Figure 4:
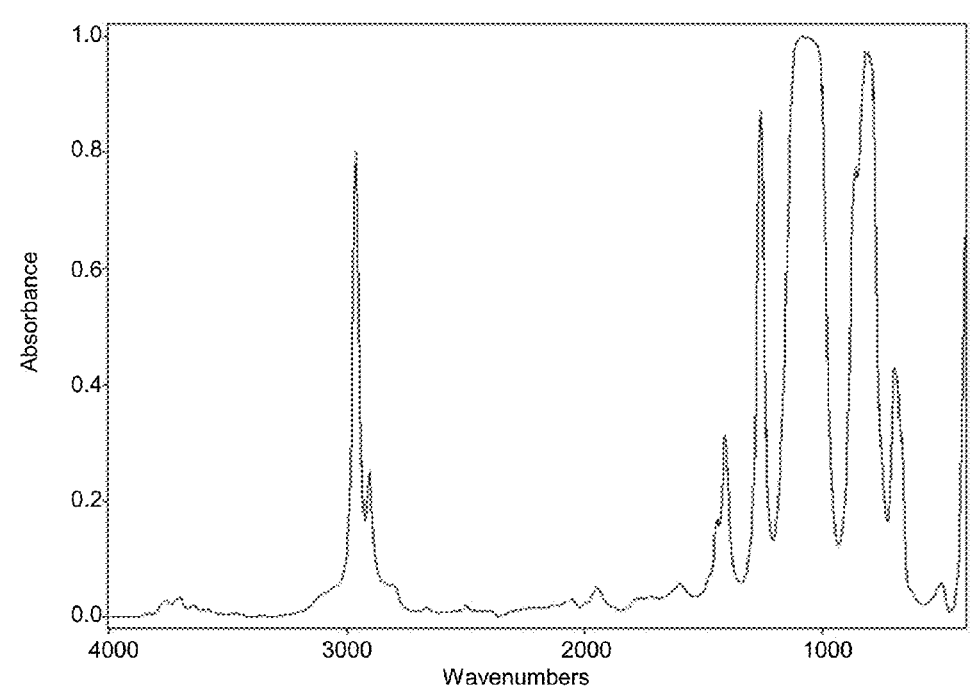
FIG. 4 is an FTIR reference spectrum of a poly(dimethylsiloxane) material.

The spectra of FIGS. 5 and 6 were collected and compared to reference spectra of FIGS. 3 and 4, respectively. The several unmatched features are in the adhesive spectra but are present in the adhesive samples. Most interestingly, the typical urethane peak structure is present at 1536 cm$^{-1}$ (N—H deformation) and 1715-1730 cm$^{-1}$ (urethane C═O stretch) but there are also additional features in these regions at 1509 cm$^{-1}$ and 1659 cm$^{-1}$. These features correspond to polyurethane bonds with non-carbon substitutions in proximity to the linkage. This could correspond to the siloxane modification of urethane precursors.

Figure 7:
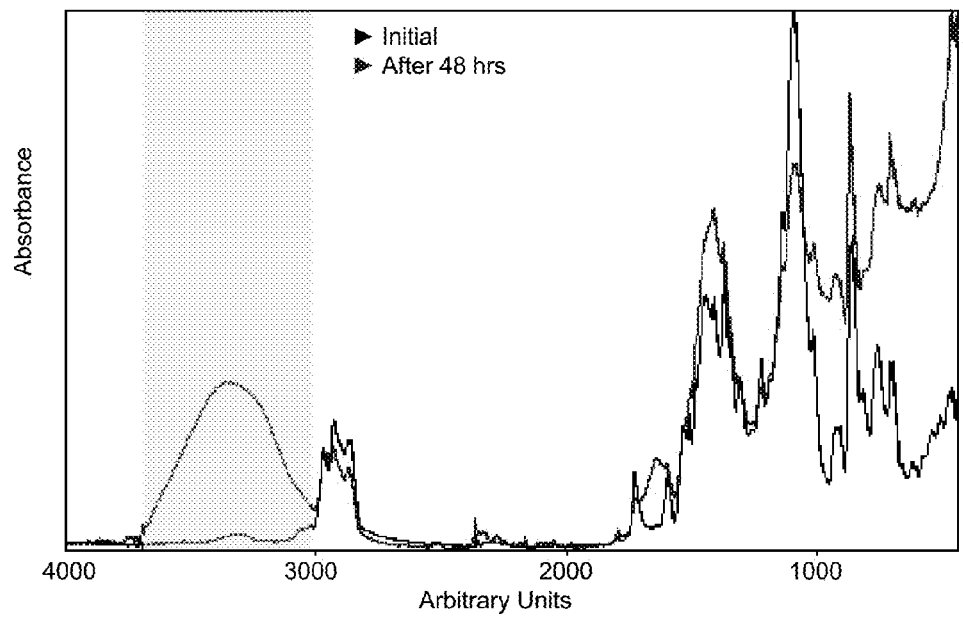
FIG. 7 is an FTIR spectral overlay of a commercial urethane adhesive before (black) and after 48 hour (blue) exposure to simulated concrete pore water.

Referring now to FIG. 7, all FTIR data were collected using a JASCO 6100 Infra-red spectrometer equipped with a Golden Gate Attenuated Total Reflectance (ATR) Cell. Spectra were analyzed using BioRad's KnowItAll Informatics System, Jasco IR Edition. A sample was scanned 128 times to obtain a high signal to noise ratio. A sample of typical polyurethane adhesive material was submitted for chemical characterization before and after exposure to simulated concrete pore water. The sample was identified as a commercial urethane adhesive and was reported as a typical urethane flooring adhesive.

The adhesive sample was laid up on six glass slides. Samples were allowed to dry for 72 hrs. Initial FTIR data was collected for baseline information. The samples were then exposed to simulated concrete pore water (as per ASTM D7705 section 8.2, water chemistry 1.6 M Ca(OH)$_2$, 0.0225 M NaOH, and 0.075 M KOH, pH of 12.6 to 13.0) for 48 hours. The samples were rinsed in distilled water and dried for 1 hour. After 1 hour drying time, the samples were evaluated by FTIR and compared to their unexposed spectra, as shown in FIG. 7. In the spectrum, the black trace is the cured adhesive, the blue trace is the 48 hour concrete pore water exposed adhesive. The 48 hr spectrum showed a significant increase in the broad peak at 3400 cm$^{-1}$, representative of hydroxyl groups (a hydrolysis product) and water. This is a clear sign of both water uptake by the adhesive and the degradation of the product. An additional time point could not be collected because the adhesive layup detached from the slide and was contaminated during the exposure. Based on these results, the commercial urethane adhesive does not have waterproof properties base on the degradation observed with the FTIR.

Referring now to FIGS. 8-11, all FTIR data were collected using a JASCO 6100 Infra-red spectrometer equipped with a Golden Gate Attenuated Total Reflectance (ATR) Cell. Spectra were analyzed using BioRad's KnowItAll Informatics System, Jasco IR Edition. Each sample was scanned 128 times to obtain a high signal to noise ratio. Four samples of adhesive materials were submitted for chemical characterization before and after exposure to simulated concrete pore water. One of the samples was identified as "cheap glue" and was reported to be an acrylic flooring adhesive without waterproof properties. The other three samples were identified as VCT, VSF, and LVT adhesives of the present invention.

Each of the four adhesive samples was laid up on a glass slide. Three samples were prepared for each product for a total of 12 sample slides. Samples were allowed to dry for 72 hrs. Initial FTIR data was collected for baseline information. The samples were then exposed to simulated concrete pore water (as per ASTM D7705 section 8.2, water chemistry 1.6 M Ca(OH)$_2$, 0.0225 M NaOH, and 0.075 M KOH, pH of 12.6 to 13.0) for 48 hours and 20 days. The samples were rinsed in distilled water and dried for 1 hour. After 1 hour drying time, the samples were evaluated by FTIR and compared to their unexposed spectra. In all spectra, the black trace is the as cured adhesive, the blue trace is the 48 hour concrete pore water exposed adhesive, and the red trace is the 20 day exposed adhesive.

Figure 8:
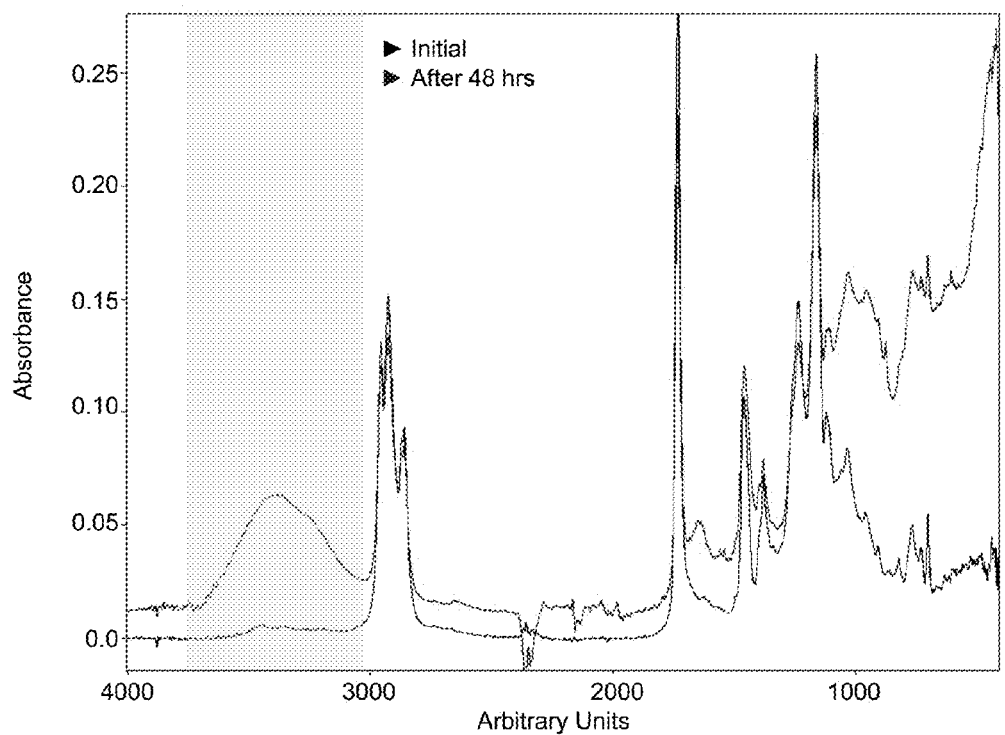
FIG. 8 is an FTIR spectral overlay of a commercial acrylic adhesive before (black) and after 48 hour (blue) exposure to simulated concrete pore water.

As shown in FIG. 8, in the case of the acrylic flooring adhesive, the 48 hr spectrum showed a significant increase in the 3400 cm$^{-1}$ peak, representative of hydroxyl groups (a hydrolysis product) and water. This is a clear sign of both water uptake by the adhesive and the degradation of the product. After 20 days exposures, the cheap glue had lost adhesion to the slide and was considered contaminated, therefore an additional time point could not be collected.

Figure 9:
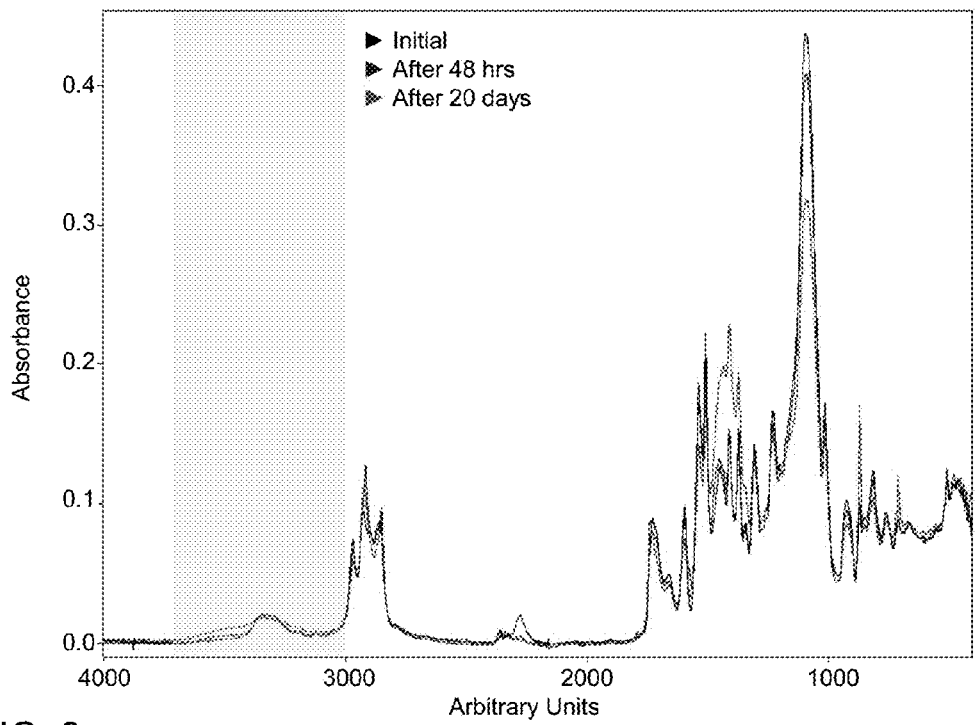
FIG. 9 is an FTIR spectral overlay of an LVT adhesive sample of the present invention before (black) and after 48 hour (blue) and 20 day (red) exposure to simulated concrete pore water.
Figure 10:
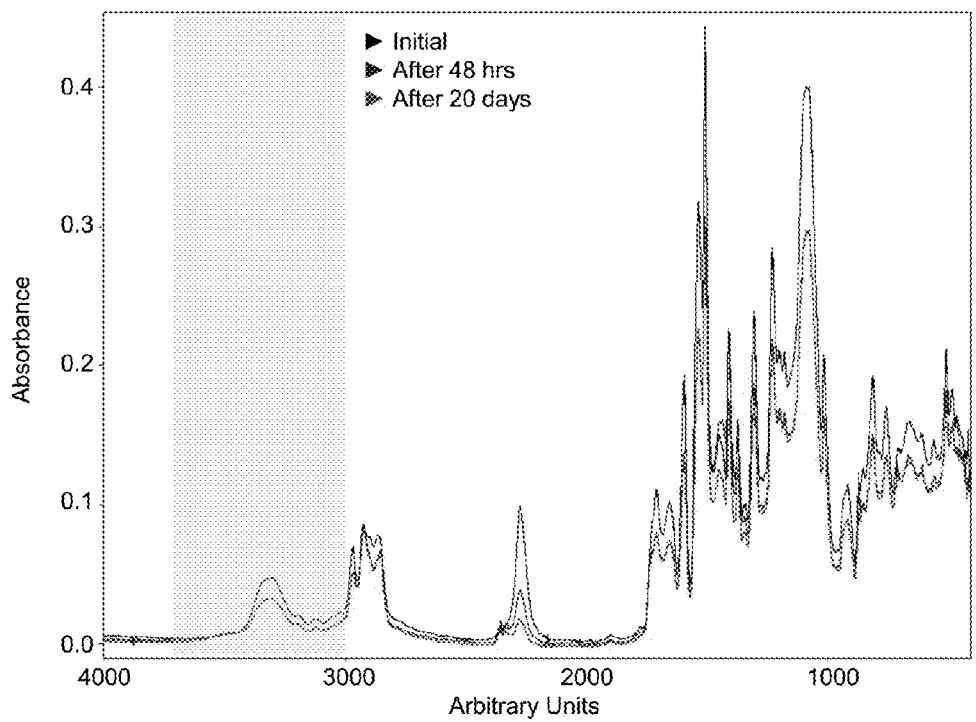
FIG. 10 is an FTIR spectral overlay of a VCT adhesive sample of the present invention before (black) and after 48 hour (blue) and 20 day (red) exposure to simulated concrete pore water.
Figure 11:
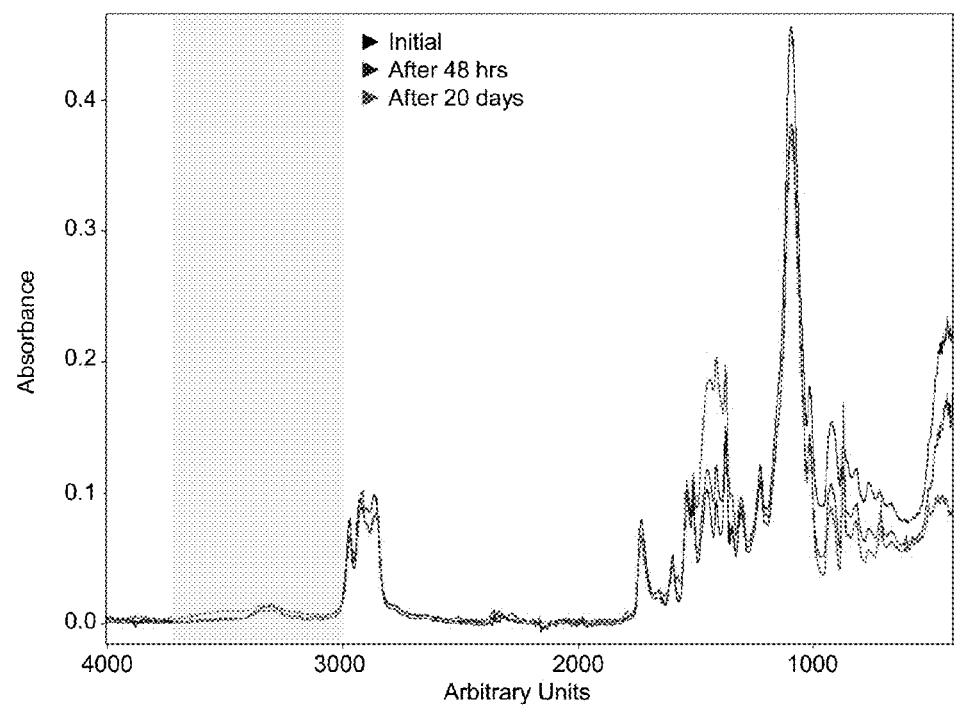
FIG. 11 is an FTIR spectral overlay of a Vinyl Sheet Flooring (VSF) adhesive sample of the present invention before (black) and after 48 hour (blue) and 20 day (red) exposure to simulated concrete pore water.

As shown in FIGS. 9-11, the FTIRs of the embodiments of the present invention did not show any indications of chemical degradation after 48 hours. The main visible change in these spectra was the loss of the 2270 cm$^{-1}$ peak with increasing exposure. This feature is associated with the continued curing of the isocyanates in the polyurethane and is not an effect of the exposure. There are no obvious signs of degradation associated with the exposure to the simulated concrete pore water. The samples remained adhered to the glass slides for the duration of the testing.

Referring now to FIGS. 12-15, all FTIR data were collected using a JASCO 6100 Infra-red spectrometer equipped with a Golden Gate Attenuated Total Reflectance (ATR) Cell. Spectra were analyzed using BioRad's KnowItAll Informatics System, Jasco IR Edition. Each sample was scanned 128 times to obtain a high signal to noise ratio. Four samples of adhesive materials were submitted for chemical characterization before and after exposure to simulated concrete pore water. Initially, the samples were identified as A, B, D, and E. Sample A was later identified as a first commercial VCT adhesive and sample B was identified as a second commercial VCT adhesive, different from sample A. Sample D was later identified as the LVT adhesive of the present invention and sample E was identified as the VCT adhesive of the present invention.

Each of the four adhesive samples was laid up on a glass slide. Four samples were prepared for each product for a total of 16 sample slides. Samples were allowed to dry for 72 hrs. Initial FTIR data was collected for baseline information. The samples were then exposed to simulated concrete pore water (as per ASTM D7705 section 8.2, water chemistry 1.6 M Ca(OH)$_2$, 0.0225 M NaOH, and 0.075 M KOH, pH of 12.6 to 13.0) for 600 days (24 Oct. 2013 to 15 Jun. 2015). The samples were rinsed in distilled water and dried for 48 hours. After 48 hour drying time, the samples were evaluated by FTIR and compared to their unexposed spectra. In all spectra, the red trace is the "as cured" adhesive, and the other traces are the individual samples after 600 days exposure to simulated concrete pore water. For samples A and D, two of the slides became damaged and could not be analyzed at 600 days.

Figure 12:
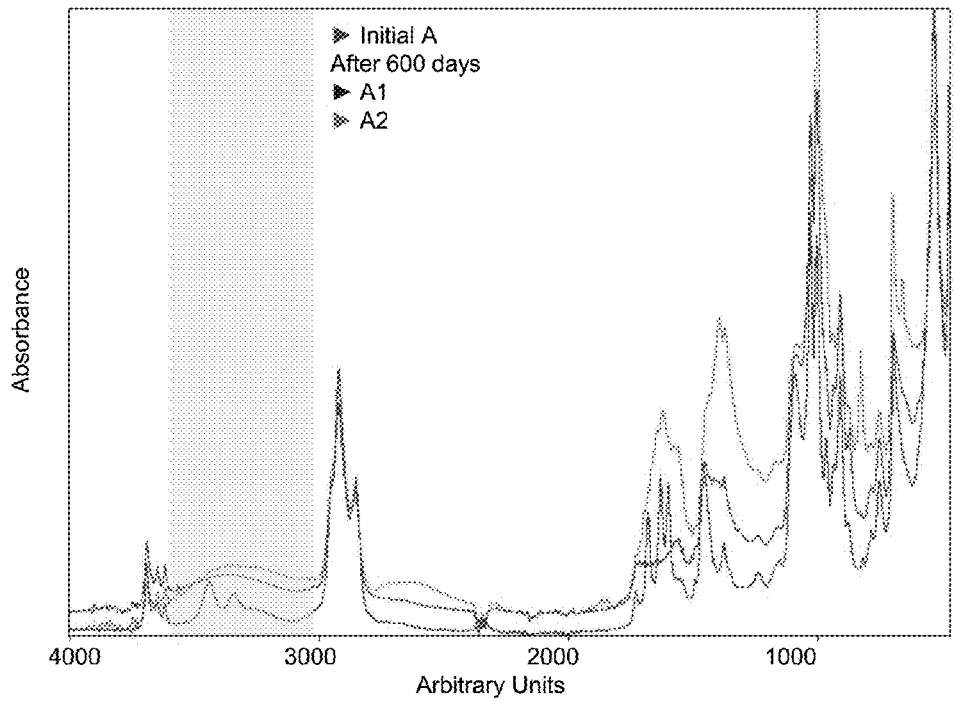
FIG. 12 is an FTIR spectral overlay of a first commercial VCT adhesive sample before (red) and after 600 day (blue and green) exposure to the simulated concrete pore water.
Figure 13:
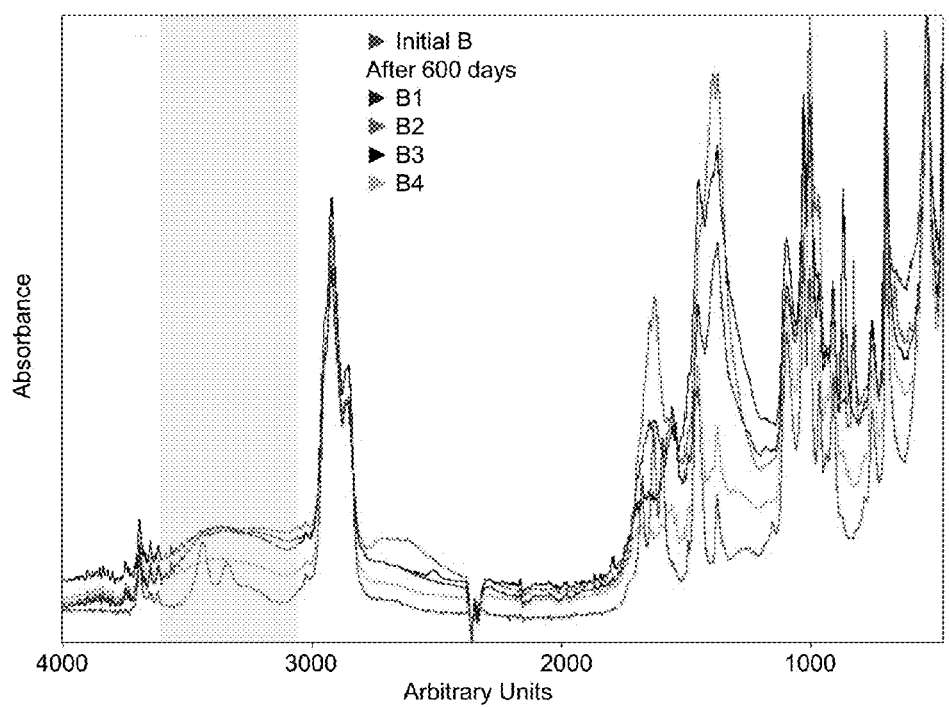
FIG. 13 is an FTIR spectral overlay of a second commercial VCT adhesive sample before (red) and after 600 day (black, blue, pink, and cyan) exposure to the simulated concrete pore water.

FIGS. 12 and 13 show data for samples A and B, respectively. The broad peak at 3400 cm$^{-1}$ represents the presence of hydroxyl groups (a hydrolysis product). These variations are attributed to chemical degradation of the adhesive caused by exposure to the simulated concrete pore water. The loss of peak structure in the lower wavenumber region also shows that the samples have degraded significantly compared to the original material.

Figure 14:
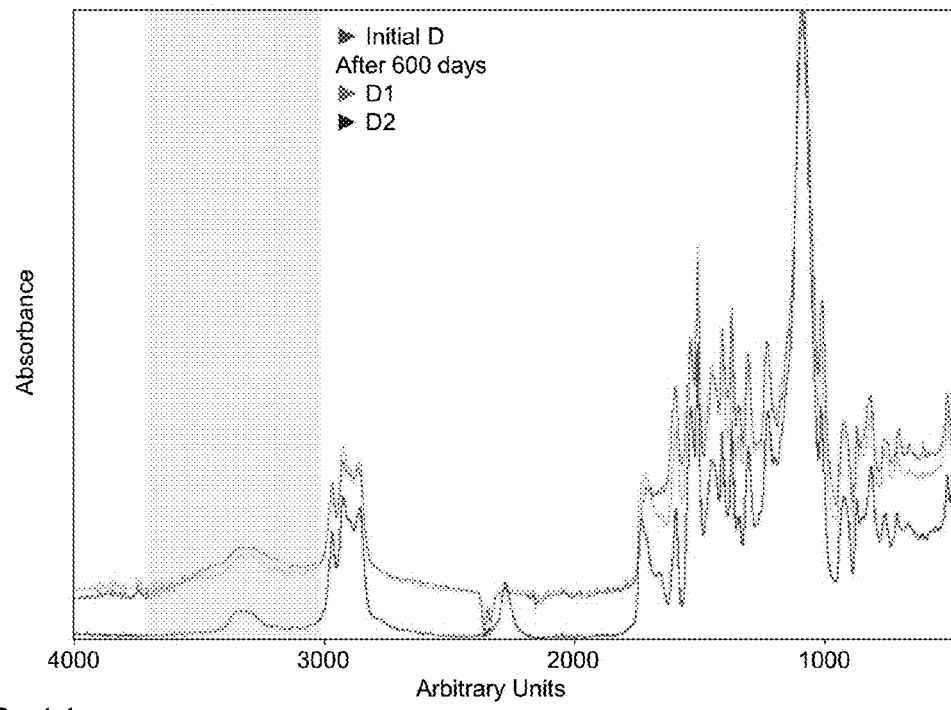
FIG. 14 is an FTIR spectral overlay of the LVT adhesive sample before (red) and after 600 days (blue and green) exposure to the simulated concrete pore water.
Figure 15:
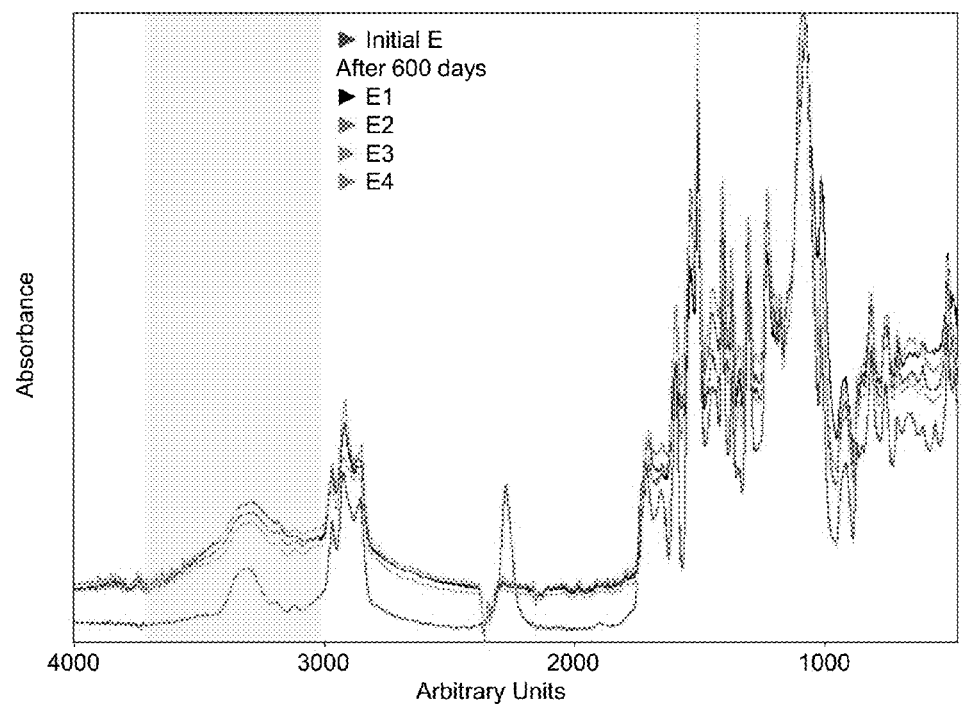
FIG. 15 is an FTIR spectral overlay of the VCT adhesive sample before (red) and after 600 days (black, blue, green, and orange) exposure to the simulated concrete pore water.

Data for samples D and E are shown in FIGS. 14 and 15, respectively. The biggest change observed is the loss of the 2270 cm$^{-1}$ peak with exposure. This feature is associated with the continued curing of the isocyanates in the polyurethane and is not a negative effect of the exposure. There are no other significant changes in the spectrum for the test, indicating that there are no significant chemical changes in the material for the duration of the simulated concrete pore water.

Table 11 describes another non-limiting example of an adhesive of the present invention. Pigment is not required in order to obtain performance results. To achieve a waterproof, pH-resistant formulation, the incorporation of hydrophobically modified additives carried by an aliphatic hydrocarbon quenching agent may be necessary. The quencher may separate the urethanes (e.g., increase the activation energy so that the formulation is not reactive or has little reactivity). The silane component (e.g., gamma-aminopropyltrimethoxysilane) end-caps the urethane prepolymers. Dibutyltindilaurate is an aliphatic metal catalyst used in some embodiments to initiate cure of the adhesive by moisture. In some embodiments, the catalyst is used to accelerate the reaction (e.g., the reaction in the presence of the catalyst may be allowed to react for about 10 to 20 minutes, about 15 to 20 minutes, about 20 to 30 minutes, or more than about 30 minutes, etc.). In other embodiments, substitution of the catalyst by other chemistries is possible. In still other embodiments, the catalyst may not be required.

TABLE 11

| Component | Percent weight |
| --- | --- |
| Slow-cure urethane prepolymer | 50 |
| Flexible binder urethane prepolymer | 35 |
| Gamma-aminopropyltrimethoxysilane | 1.5 |
| Dibutyltindilaurate | 0.1 |
| Aliphatic fatty acid ester mixture | 10 |
| Vinyltrimethoxysilane | 0.7 |
| Reinforcing extender | 15 |
| Thixotropic agent | 15 |
| 3-glycidoxypropyltrimethoxysilane | 0.35 |
| Pigment | 0.2 |

Table 12.1, Table 12.2, and Table 12.3 describe other non-limiting examples of an adhesive of the present invention. As previously stated, pigment is not required in order to obtain performance results.

TABLE 12.1

| Component | Percent weight |
| --- | --- |
| Slow-cure urethane prepolymer | 50 |
| Flexible binder urethane prepolymer | 35 |
| Silane (e.g., amino-functional alkoxysilane) | 1.5 |
| Catalyst (e.g., aliphatic metal catalyst) | 0.1 |
| Quenching agent (e.g., aliphatic hydrocarbon quenching agent) | 10 |
| Moisture scavenging agent | 0.7 |
| Reinforcing extender | 15 |

TABLE 12.1-continued

| Component | Percent weight |
| --- | --- |
| Thixotropic agent | 15 |
| Pigment | 0.2 |

TABLE 12.2

| Component | Ranges of Percent Weights |
| --- | --- |
| Silane end-capped polymeric material | 65-95 |
| Aliphatic quencher | 5-15 |
| Reinforcing extender | 5-15 |
| Thixotropic agent | 3-15 |

TABLE 12.3

| Component | Ranges of Percent Weights |
| --- | --- |
| Urethane prepolymer | 65-95 |
| Silane (e.g., amino-functional alkoxysilane) | 0.5-5 |
| Aliphatic quencher | 5-15 |
| Reinforcing extender | 5-15 |
| Thixotropic agent | 3-15 |

Table 13 describes another non-limiting example of an adhesive of the present invention. A single urethane prepolymer possessing properties similar to the mixture of the slow-cure urethane prepolymer and the flexible binder urethane prepolymer used in the previous examples is substituted. Pigment is not required in order to obtain performance results.

TABLE 13

| Component | Percent Weight |
| --- | --- |
| Urethane prepolymer | 85 |
| Silane (e.g., amino-functional alkoxysilane) | 1.5 |
| Catalyst (e.g., aliphatic metal catalyst) | 0.1 |
| Quenching agent (e.g., aliphatic hydrocarbon quenching agent) | 10 |
| Moisture scavenging agent | 0.7 |
| Reinforcing extender | 15 |
| Thixotropic agent | 15 |
| Pigment | 0.2 |

Table 14 describes another non-limiting example of an adhesive of the present invention. Pigment is not required in order to obtain performance results.

TABLE 14

| Component | Percent weight |
| --- | --- |
| Slow-cure urethane prepolymer | 45-55 |
| Flexible binder urethane prepolymer | 30-40 |
| Amino-functional alkoxysilane | 1-5 |
| Aliphatic metal catalyst | 0.05-5 |
| Aliphatic hydrocarbon quenching agent | 5-15 |
| Moisture scavenging agent | 0.1-1 |
| Reinforcing extender | 10-20 |
| Thixotropic agent | 10-20 |
| Pigment | 0-1 |

In some embodiments, the desired combination of reactivity and hardness properties of the slow-cure urethane prepolymer and flexible binder urethane prepolymer mixture may be achieved by blending the two components, each with its own specific % NCO content. For example, a slow-cure urethane prepolymer with about 15.8% NCO content can be mixed with a flexible binder urethane prepolymer with about 9.7% NCO content to achieve a desired reactivity and hardness properties that result from the blend. In some embodiments, the percent weight of the slow-cure urethane prepolymer is about 10 to 20%, about 20 to 30%, about 30 to 40%, about 40 to 50%, about 50 to 60%, or about 60 to 70%. In other embodiments, the percent weight of the flexible binder urethane prepolymer is about 10 to 15%, about 15 to 20%, or about 20 to 30%.

Alternatively, a single urethane prepolymer (a custom prepolymer) (e.g., with a % NCO content similar to the resulting % NCO content of the two-component urethane prepolymer mixture, or with a % NCO content less than or greater than the resulting % NCO content of the two-component urethane prepolymer mixture) could be used to achieve a desired reactivity and hardness properties. For example, a urethane prepolymer with a % NCO content of about 12% NCO could have workable reactivity and hardness properties, thereby eliminating the need to blend two separate components. The percent weight of the urethane prepolymer can be about 10 to 20%, about 20 to 30%, about 30 to 40%, about 40 to 50%, about 50 to 60%, about 60 to 70%, or about 70 to 85%.

Modifying the ratio between the slow-cure urethane prepolymer and the flexible binder urethane prepolymer may allow for varied application and substrate suitability. For example, in some embodiments, the weight ratio of the flexible binder urethane prepolymer to the slow-cure urethane prepolymer is about 7:10. In some embodiments, the weight ratio of the flexible binder urethane prepolymer to the slow-cure urethane prepolymer is greater than about 7:10, for example about 4:5, 9:10, 1:1, 6:5, 3:2, etc. Such an increase over the 7:10 ratio may increase flexibility and elongation. In some embodiments, high ratios of flexible binder urethane prepolymer to slow-cure urethane prepolymer (e.g., greater than about 7:10) provides a dry film suitable for use with flooring substrates that demonstrate dimensional properties of expansion and contraction. A softer or more flexible product may also function as a sound abatement system (e.g., for wood flooring installations). In some embodiments, the ratio of the flexible binder urethane prepolymer to the slow-cure urethane prepolymer is less than about 7:10, for example about 3:5, 1:2, 2:5, 3:10, 1:5, 1:10, etc. Such a decrease below the 7:10 ratio may reduce flexibility and may increase modulus and/or reduce elastic deformation.

Altering the ratio to incorporate more of higher functionality urethane creates hard setting adhesives suitable for applications including masonry, concrete anchoring, and concrete laminates. Due to the hydrophobic silanol-bridge bonding mechanism, the present invention exhibits excellent exterior stability to changes in humidity and temperature. Harder setting variants of the formulation provide maximum bond strengths to flexible substrates.

Rubber flooring materials exhibit flexibility and excellent wear properties, but may be susceptible to effects associated with osmotic activity. Rubber has low vapor permeability. When coupled with sub slab moisture vapor emissions, vapor may condense at the bond line between flooring and concrete (which can ultimately cause osmotic blister formation). The present invention provides a hydrophobic bond line that repels liquid moisture effectively preventing osmotic events. The present invention is not solely contained at the concrete to flooring interface and penetrates the concrete, covalently bonding to either substrate forming a concrete to flooring material interface that is more intimate than conventional adhesive materials.

In accordance with the present invention, a slow-cure urethane prepolymer can comprise urethane, silane, carboxylate, epoxies, polyesters, phenolics, the like, or a combination thereof. The prepolymers are not limited to the aforementioned examples.

Components of the adhesive of the present invention may be mixed in sequence (e.g., under high speed dispersion, in an open tank configuration, etc.). In some embodiments, external humidity levels are can range from 50 to 100%, i.e. 70%. As used herein, the CRC Publishing's *Coatings Technologies Handbook* 3rd Edition defines high speed dispersion as a type of mixing wherein solids are dissolved in a liquid by suctioning the solid and liquid mixture into a disc rotating at high speeds. High speed dispersion is known to one of ordinary skill in the art.

The present invention also features modifications to flooring materials to promote chemical bond and increase adhesive strength (e.g., see FIG. 2). Without wishing to limit the present invention to any theory or mechanism, it is believed that incorporating adhesion promoters in the composition of the flooring material backing may improve the performance and moisture resistance of the flooring material. In combination with the adhesive of the present invention, the flooring material may better resist the effects of elevated moisture exposure, creating a waterproof flooring installation. The adhesive may function to mitigate the moisture alone and develop a permanent waterproof bond in concert with the modified flooring material. The hydrophobic nature of the present invention coupled with adhesive properties may provide an "all-in-one" moisture mitigation/adhesive solution to flooring installation.

As used herein, the term "about" refers to plus or minus 10% of the referenced number. For example, an embodiment wherein the percent weight of the slow-cure urethane prepolymer is about 50% includes a percent weight in a range of 45 and 55%. Furthermore, ratios and percentages are given as weights unless specified otherwise.

Method of Production

The present invention features a method of dispersing a urethane prepolymer. In some embodiments, the method comprises providing a urethane prepolymer and adding a solvent comprising a fatty acid ester component, wherein the solvent homogeneously disperses the urethane prepolymer. In some embodiments, the method further comprises adding a silane. In some embodiments, the method further comprises adding a reinforcing extender. In some embodiments, the method further comprises adding a thixotropic agent.

In some embodiments, the wt ratio of the fatty acid component to the urethane prepolymer is 10 to 20:40 to 80. In some embodiments, the ratio of the fatty acid component to the urethane prepolymer is 14 to 16:40 to 50. In some embodiments, the ratio of the fatty acid component to the urethane prepolymer is 14 to 16:65 to 75. In some embodiments, the ratio of the fatty acid component to the urethane prepolymer is 14.5:44. In some embodiments, the ratio of the fatty acid component to the urethane prepolymer is 14.5:71.5.

The present invention also features the method of producing a polymeric matrix adhesive. In some embodiments, the method comprises providing a silane end-capped polymeric component, adding a reinforcing extender; and adding a thixotropic agent. In some embodiments, the polymeric matrix adhesive is produced at a relative humidity of at least 1%. In other embodiments, the method may further comprise adding an aliphatic quencher. In further embodiments, the method may further comprise adding carbon nanofibers and a static dissipative component, effective for increasing electrical conductivity of the adhesive. Preferably, the resulting adhesive is waterproof, hydrolytically stable, and pH-resistant.

In some embodiments, the step of providing a silane end-capped polymeric component comprises combining a silane, such as an amine-functionalized silane, and a prepolymer urethane to produce the silane end-capped polymeric component. Preferably, the prepolymer urethane has an average NCO content of about 7 to 23. In one embodiment, the urethane component may comprise at least one urethane selected from a group consisting of a slow-cure urethane having a functionality (Fn) of about 2.5 to 2.55 and an NCO content of about 15 to 23%, and a flexible binder urethane having a functionality (Fn) of about 2 and an NCO content of about 2 to 10%. In further embodiments, the method may further comprise adding a polyether, such as polyether polyol, or an alkoxy functionalized silicone polymer, as a substitute of the flexible binder urethane or the slow-cure urethane.

As understood by one of ordinary skill, the relative humidity is the ratio of the partial pressure of water vapor in an air-water mixture to the saturated vapor pressure of water at a given temperature. In some embodiments, the method can be performed at a relative humidity of about 1% to 20%, about 20% to 40%, about 40%-60%, about 60% to 80%, or about 80% to 100%. Preferably, the method can be performed at any level of relative humidity without requiring vacuum conditions and without adverse effects on the adhesive.

EXAMPLE 1

The following is an example of a method of producing a composition of the present invention. Components of the adhesive of the present invention may be mixed in sequence (e.g., under high speed dispersion, in an open tank configuration, etc.).

1. Add 50% wt. (by weight of total formulation) slow-cure urethane prepolymer with 15.8% NCO content.
2. Add and continuously blend 35% wt. flexible binder urethane prepolymer with 9.7% NCO content.
3. Add and continuously blend 1.5% wt. gamma-aminopropyltrimethoxysilane.
4. Add and continuously blend 0.1% wt. dibutyltinlaurate to catalyze the reaction.
5. Allow components 1-4 to blend thoroughly (approximately 15-20 minutes).
6. Add and continuously blend 10% wt. mixture of aliphatic fatty acid ester (non-petroleum base) to quench the urethane reaction.
7. Add and continuously blend 0.7% wt. vinyltrimethoxysilane to scavenge potential atmospheric humidity (from open tank configuration).
8. Add and continuously blend 15% wt. surface-treated natural calcium carbonate reinforcing extender to add body to the formulation and build viscosity.
9. Add and continuously blend 15% wt. surface treated fumed silicate to achieve "high viscosity with low shear, and low viscosity with high shear" appropriate for trowel application.
10. Add and continuously blend 0.35% wt. 3-glycidoxypropyltrimethoxysilane.
11. Add and continuously blend 0.2% wt. pigment to achieve desired aesthetics.

EXAMPLE 2

The following is another example of a method of producing a composition of the present invention. Components of the adhesive of the present invention may be mixed in sequence (e.g., under high speed dispersion, in an open tank configuration, etc.).

1. Add 43% wt. (by weight of total formulation) slow-cure urethane prepolymer with 16% NCO content. In some embodiments, the slow-urethane prepolymer has a % NCO content between about 5% to 25%.
2. Add 1% wt. (by weight of total formulation) slow-cure urethane prepolymer with 22% NCO content. In some embodiments, the slow-urethane prepolymer has a % NCO content between about 15% to 35%.
3. Add and continuously blend 26% wt. polyether polyol tackifier.
4. Add and continuously blend 1% wt. gamma-aminopropyltrimethoxysilane.
5. Add and continuously blend 0.2% wt. dibutyltinlaurate to catalyze the reaction.
6. Allow components 1-5 to blend thoroughly (approximately 15-20 minutes).
7. Add and continuously blend 14.5% wt. mixture of aliphatic fatty acid ester (non-petroleum base) to disperse the urethane prepolymer and quench the urethane reaction.
8. Add and continuously blend 0.3% wt. vinyltrimethoxysilane to scavenge potential atmospheric humidity (from open tank configuration).
9. Add and continuously blend 9% wt. surface-treated natural calcium carbonate reinforcing extender to add body to the formulation and build viscosity.
10. Add and continuously blend 3% wt. surface treated fumed silicate to achieve "high viscosity with low shear, and low viscosity with high shear" appropriate for trowel application.
11. Add and continuously blend 1.5% wt. methyl ester of rosin, to plasticize the adhesive and/or reduce moisture sensitivity and/or enhance flexibility and adhesion to low energy flooring substrates.
12. Add and continuously blend 0.5% wt. pigment to achieve desired aesthetics.

EXAMPLE 3

The following is another example of a method of producing a composition of the present invention. Components of the adhesive of the present invention may be mixed in sequence (e.g., under high speed dispersion, in an open tank configuration, etc.).

1. Add 53.5% wt. (by weight of total formulation) slow-cure urethane prepolymer with 16% NCO content. In some embodiments, the slow-urethane prepolymer has a % NCO content between about 5% to 25%.
2. Add and continuously blend 18% wt. flexible binder urethane prepolymer with 9.7% NCO content. In some embodiments, the slow-urethane prepolymer has a % NCO content between about 5% to 15%.
3. Add and continuously blend 1% wt. gamma-aminopropyltrimethoxysilane.
4. Add and continuously blend 0.1% wt. dibutyltinlaurate to catalyze the reaction.

5. Allow components 1-4 to blend thoroughly (approximately 15-20 minutes).
6. Add and continuously blend 14.5% wt. mixture of aliphatic fatty acid ester (non-petroleum base) to disperse the urethane prepolymer and quench the urethane reaction.
7. Add and continuously blend 0.4% wt. vinyltrimethoxysilane to scavenge potential atmospheric humidity (from open tank configuration).
8. Add and continuously blend 9% wt. surface-treated natural calcium carbonate reinforcing extender to add body to the formulation and build viscosity.
9. Add and continuously blend 0.5% wt. pigment to achieve desired aesthetics.

EXAMPLE 4

The following is another example of a method of producing a composition of the present invention. Components of the adhesive of the present invention may be mixed in sequence (e.g., under high speed dispersion, in an open tank configuration, etc.).
1. Add 55-70% wt. (by weight of total formulation) slow-cure urethane prepolymer with 16% NCO content.
2. Add and continuously blend 15-30% wt. flexible binder urethane prepolymer with 9.7% NCO content.
3. Add and continuously blend 0.01-1.5% wt. gamma-aminopropyltrimethoxysilane.
4. Add and continuously blend 0.001-0.01% wt. dibutyltinlaurate to catalyze the reaction.
5. Add and continuously blend 5-10% wt. mixture of aliphatic fatty acid ester to disperse the urethane prepolymer and quench the urethane reaction.
6. Add and continuously blend 0.01-0.05% wt. vinyltrimethoxysilane to scavenge potential atmospheric humidity.
7. Add and continuously blend 3-10% wt. hydrophobically-modified reinforcing extender to add body to the formulation and build viscosity.
8. Add and continuously blend 1-5% wt. hydrophobically-modified thixotroic agent.
9. Add and continuously blend 0.5-2% wt. methyl ester of rosin.
10. Add and continuously blend 0.5% wt. pigment to achieve desired aesthetics.

EXAMPLE 5

The following is another example of a method of producing a composition of the present invention. Components of the adhesive of the present invention may be mixed in sequence (e.g., under high speed dispersion, in an open tank configuration, etc.).
1. Add 40-55% wt. (by weight of total formulation) slow-cure urethane prepolymer with 16% NCO content.
2. Add and continuously blend 25-40% wt. polyether polyol.
3. Add and continuously blend 0.01-1.5% wt. gamma-aminopropyltrimethoxysilane.
4. Add and continuously blend 0.001-0.01% wt. dibutyltinlaurate to catalyze the reaction.
5. Add and continuously blend 5-10% wt. mixture of aliphatic fatty acid ester to disperse the urethane prepolymer and quench the urethane reaction.
6. Add and continuously blend 0.01-0.05% wt. vinyltrimethoxysilane to scavenge potential atmospheric humidity.
7. Add and continuously blend 3-10% wt. hydrophobically-modified reinforcing extender to add body to the formulation and build viscosity.
8. Add and continuously blend 1-5% wt. hydrophobically-modified thixotropic agent.
9. Add and continuously blend 0.5-2% wt. methyl ester of rosin.
10. Add and continuously blend 0.5% wt. pigment to achieve desired aesthetics.

EXAMPLE 6

The following is another example of a method of producing a composition of the present invention. Components of the adhesive of the present invention may be mixed in sequence (e.g., under high speed dispersion, in an open tank configuration, etc.).
1. Add 10-30% wt. (by weight of total formulation) slow-cure urethane prepolymer with 16% NCO content.
2. Add and continuously blend 40-60% wt. polyether polyol.
3. Add and continuously blend 0.01-1.5% wt. gamma-aminopropyltrimethoxysilane.
4. Add and continuously blend 0.001-0.01% wt. dibutyltinlaurate to catalyze the reaction.
5. Add and continuously blend 5-10% wt. mixture of aliphatic fatty acid ester to disperse the urethane prepolymer and quench the urethane reaction.
6. Add and continuously blend 0.01-0.05% wt. vinyltrimethoxysilane to scavenge potential atmospheric humidity.
7. Add and continuously blend 3-10% wt. hydrophobically-modified reinforcing extender to add body to the formulation and build viscosity.
8. Add and continuously blend 1-5% wt. hydrophobically-modified thixotropic agent.
9. Add and continuously blend 0.5-2% wt. methyl ester of rosin.
10. Add and continuously blend 0.5% wt. pigment to achieve desired aesthetics.

In any of the aforementioned examples, the method can include a step of adding and continuously blending a desired amount of carbon nanofibers to increase the electrical conductivity of the adhesive. Further still, the method may include a step of adding and continuously blending a desired amount of a static dissipative component to decrease the surface resistance of the adhesive.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims. In some embodiments, the figures presented in this patent application are drawn to scale, including the angles, ratios of dimensions, etc. In some embodiments, the figures are representative only and the claims are not limited by the dimensions of the figures.

In some embodiments, descriptions of the inventions described herein using the phrase "comprising" includes embodiments that could be described as "consisting of", and as such the written description requirement for claiming one or more embodiments of the present invention using the phrase "consisting of" is met.

What is claimed is:

1. A polymeric matrix adhesive composition comprising a cured product of:
   a) a silane end-capped polymer component comprising a silane and a urethane component, wherein the urethane component has an average NCO content of about 7 to 23%, wherein the urethane component comprises at least one urethane selected from a group consisting of a slow-cure urethane having a functionality (Fn) of about 2.5 to 2.55 and an NCO content of about 15 to 23%, and a flexible binder urethane having a functionality (Fn) of about 2 and an NCO content of about 7 to 10%;
   b) a reinforcing extender; and
   c) a thixotropic agent;
wherein the adhesive composition is waterproof, hydrolytically stable, and pH-resistant.

2. The composition of claim 1 comprising about 15-85 wt % of the silane end-capped polymer component, about 3-7 wt % of the reinforcing extender, and about 2-5 wt % of the thixotropic agent.

3. The composition of claim 1, wherein the reinforcing extender is hydrophobically modified.

4. The composition of claim 1, wherein the thixotropic agent is hydrophobically modified.

5. The composition of claim 1 further comprising about 25-55 wt % of a polyether diol having an average molecular weight of at least about 4,000 g/mol.

6. The composition of claim 1 further comprising about 25-55 wt % an alkoxy-functionalized silicone polymer having terminal silanol groups.

7. The composition of claim 1 further comprising about 6-10 wt % of an aliphatic quencher.

8. A polymeric matrix adhesive composition comprising a cured product of:
   a) a silane end-capped polymeric component comprising a silane and a urethane component, wherein the urethane component has an average NCO content of about 7 to 23%, wherein the urethane component comprises:
      i. a slow-cure urethane having a functionality (Fn) of about 2.5-2.55 and an NCO content of about 15 to 23%; and
      ii. a flexible binder urethane having a functionality (Fn) of about 2 and an NCO content of about 7 to 10%; wherein a weight ratio of the slow-cure urethane to the flexible binder urethane is about 2:1 to 4:1;
   b) a reinforcing extender; and
   c) a thixotropic agent;
wherein the adhesive composition is waterproof, hydrolytically stable, and pH-resistant.

9. The composition of claim 8 comprising about 75-85 wt % of the silane end-capped polymer component, about 3-7 wt % of the reinforcing extender, and about 2-5 wt % of the thixotropic agent.

10. The composition of claim 9, wherein the weight ratio of the slow-cure urethane to the flexible binder urethane is about 3:1.

11. The composition of claim 8 further comprising about 6-10 wt % of an aliphatic quencher.

12. The composition of claim 8, wherein the reinforcing extender is hydrophobically modified.

13. The composition of claim 8, wherein the thixotropic agent is hydrophobically modified.

* * * * *